United States Patent Office 2,746,954
Patented May 22, 1956

2,746,954
DIS- AND POLYAZO DYESTUFFS

Philippe Grandjean, Basel, and Walter Wehrli, Riehen, Switzerland, assignors to Sandoz A. G., Basel, Switzerland, a Swiss firm No Drawing. Application March 27, 1953,
Serial No. 345,249

Claims priority, application Switzerland April 4, 1952

6 Claims. (Cl. 260—166)

The present invention is a further development of the invention described and claimed in copending application, Ser. No. 232,662, filed June 20, 1951 (since granted on March 23, 1954, as Patent No. 2,673,198).

The said copending application discloses valuable substantive dis- and polyazo dyestuffs which are obtained by the condensation, in an aqueous medium and in presence of an acid-binding agent, of two mols of an aminoazo compound corresponding to the formula

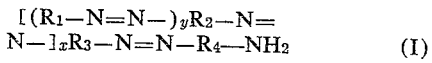

$$[(R_1-N=N-)_yR_2-N= \\ N-]_xR_3-N=N-R_4-NH_2 \quad (I)$$

wherein each of $x$ and $y$ is one of the numerals 0 and 1, and wherein each of $R_1$, $R_2$, $R_3$ and $R_4$ stands for a radical of the benzene or naphthalene series which may be substituted for example by halogen atoms, lower alkyl groups, lower alkoxy groups, acylamino groups and/or nitro groups, said aminoazo compound containing at least two solubilizing groups such as —SO$_3$H and/or —COOH, with one mol of a dicarboxylic acid halide corresponding to the formula

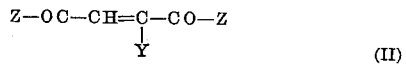

$$Z-OC-CH=C-CO-Z \\ \phantom{Z-OC-CH=}| \\ \phantom{Z-OC-CH=}Y \quad (II)$$

wherein each Z stands for Cl or Br, and Y stands for hydrogen or CH$_3$.

According to the present invention, dyestuffs with superior properties are obtained by condensing two mols of a mixture of two different non-metallizable aminoazo compounds corresponding to Formula I supra, with one mol of a dicarboxylic acid halide which corresponds to the formula

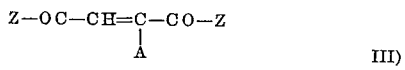

$$Z-OC-CH=C-CO-Z \\ \phantom{Z-OC-CH=}| \\ \phantom{Z-OC-CH=}A \quad (III)$$

wherein Z has the precedingly-indicated significance, and A signifies H, Cl, Br or CH$_3$, the reactants being so selected that the product possesses the number of solubilizing groups necessary to impart water-solubility thereto.

Suitable unsaturated dicarboxylic acid halides which, according to the present invention, serve for the joining together of the two aminoazo compounds of formula (I), comprise the dichlorides and dibromides of fumaric acid, maleic acid, methyl-fumaric acid, methyl-maleic acid, chloro-fumaric acid and bromo-fumaric acid, etc. In order to compensate for possible losses due to hydrolysis, it is advantageous to employ the dicarboxylic acid halides in slight excess.

In carrying out the process of the invention, the two aminoazo compounds (I) are dissolved in water, and then the dicarboxylic acid halide (III) is added, preferably at low temperature (from about 0° C. to about 30° C.). The condensation mixture is thoroughly stirred, care being taken by the addition of acid-binding agents—such for example as sodium bicarbonate, sodium carbonate, sodium hydroxide, the corresponding lithium or potassium compounds, alkaline earth metal oxides or carbonates, or appropriate tertiary organic amines such as N,N-dimethylaminobenzene—to constantly neutralize liberated hydrogen halide. The dicarboxylic acid halide may be diluted by an indifferent solvent, such for example as benzene, methylbenzene, chlorobenzene, carbon tetrachloride or chloroform. The condensation is completed when free amino can no longer be detected. The resultant reaction product is in part already precipitated, and the remainder is isolated from the reaction solution by salting-out or, in some cases, by acidification, the precipitate being then filtered, washed if necessary, and dried. It contains as integrating constituent a component of the formula

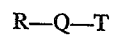

R—Q—T wherein R is the radical of the one aminoazo compound (I) acylated in the amino group, T is the radical of the other aminoazo compound (I) acylated in the amino group, and Q is the radical of the dicarboxylic acid corresponding to the dicarboxylic acid halide (III). The two symmetrical products of the formulae R—Q—R and T—Q—T are also present.

The two different aminoazo compounds (I) may be joined together in the 1:1 proportion by the dicarboxylic acid halide (III). However, valuable dyestuffs are also obtained with other mixture proportions, as for example when the condensation products are prepared from one mol of dicarboxylic acid halide (III) and two parts of two different aminoazo compounds (I) which are present in the 4:1, 3:1, 2:1, 1:2, 1:3 or 1:4 proportion.

The new water-soluble, non-metallizable dyestuffs of the present invention may be defined as corresponding to the formula

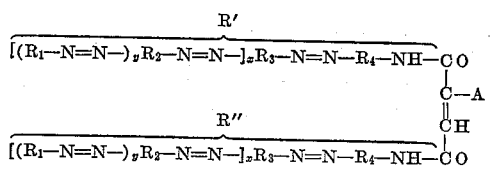

$$\overbrace{[(R_1-N=N-)_yR_2-N=N-]_xR_3-N=N-R_4-NH}^{R'}-CO \\ \phantom{xxxxxxxxxxxxxxxxxxxxxxxxxxxxxxxxxxxxxxxxxxxx} | \\ \phantom{xxxxxxxxxxxxxxxxxxxxxxxxxxxxxxxxxxxxxxx} C-A \\ \phantom{xxxxxxxxxxxxxxxxxxxxxxxxxxxxxxxxxxxxxxxxx} \| \\ \phantom{xxxxxxxxxxxxxxxxxxxxxxxxxR''xxxxxxxxxxxxxxxxxx} CH \\ \underbrace{[(R_1-N=N-)_yR_2-N=N-]_xR_3-N=N-R_4-NH}_{R''}-CO$$

wherein $x$, $y$, $R_1$, $R_2$, $R_3$, $R_4$ and A have the hereinbefore-recited significances, and at least one of $R_1$, $R_2$, $R_3$ and $R_4$ carries at least one solubilizing group, and wherein the moieties R' and R'' are not identical although they correspond to the same type formula. The present invention comprises products which are superior to the symmetrical dyestuffs of the aforementioned copending application, as regards affinity to vegetable fibers and as regards the fastness of their dyeings to wet treatments. The dyeings obtainable according to the present invention comprise dyeings with shades which as regards color tone, depth of color and vividness, can not be obtained with the symmetrical dyestuffs of the said copending application.

The following examples set forth representative exemplary embodiments of the invention, and are intended to be illustrative only and not at all limitative. In these examples, the parts and percentages are by weight, and the temperatures are in degrees centigrade.

Example 1

348 parts (0.75 mol) of the aminomonoazo compound prepared by coupling diazotized 2-aminonaphthalene-4,8-disulfonic acid with 1-amino-3-acetylaminobenzene, and 69.3 parts (0.25 mol) of 4'-amino-1,1'-azobenzene-4-sulfonic acid are together dissolved at room temperature (about 20–30°) in water with the addition of aqueous sodium hydroxide solution. Into the resultant solution there are then simultaneously added, dropwise and with good stirring, a mixture of 76.5 parts (0.5 mol) of fumaric acid dichloride and 80 parts of benzene, and such quantity of aqueous sodium carbonate solution as is necessary to keep the reaction weakly alkaline throughout. After all the fumaric acid dichloride has been added, stirring of the reaction solution is continued until no more free amino can be detected. The formed dystuff mixture is then separated from the warm solution with the aid of sodium chloride, filtered off and dried. It is a yellow powder which dyes cotton and fibers of regenerated cellulose in greenish yellow shades which are very fast to light. The asymmetrical component of the mixture corresponds to the formula

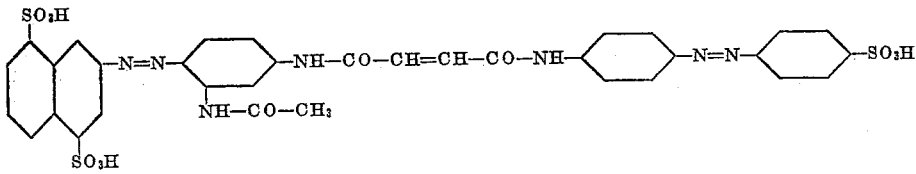

The identical dyestuff is obtained if, in the foregoing, the fumaric acid dichloride is replaced by 0.5 mol of fumaric acid dibromide.

By replacing the 0.75 mol of the aminomonoazo compound by 0.9 mol thereof and correspondingly replacing the 0.25 mol of 4'-amino-1,1'-azobenzene-4-sulfonic acid by 0.1 mol thereof, and otherwise proceeding according to the first paragraph of this example, a valuable dyestuff of high substantivity is obtained.

Dyestuffs with similar properties are also obtained when, while following the procedure outlined in this example, on the one hand the 2-aminonaphthalene-4,8-disulfonic acid—used in preparing the first initial aminomonoazo compound—is replaced by an other aminonaphthalene disulfonic acid, such for examule as 2-aminonaphthalene-6,8-disulfonic acid, 2-aminonaphthalene-5,7-disulfonic acid, 2-aminonaphthalene-1,5-disulfonic acid, or 1-aminonaphthalene-3,6-disulfonic acid and/or the 1-amino-3-acetylaminobenzene by another amine of the benzene series, such for example as aminobenzene, 1-amino-2-methylbenzene, 1-amino-3-methylbenzene, 1-amino-3-ethylbenzene, 1 - amino - 2,5 - dimethylbenzene, 1 - amino-2-methoxybenzene, 1-amino-2-methoxy-5-methylbenzene, 1 - amino - 2 - methoxy - 5 acetylaminobenzene, 1-amino-2,5-dimethoxybenzene, 1-amino-2,5-diethoxybenzene, 1-amino-3-formylaminobenzene, 1-amino-3-propionylaminobenzene, 1-amino-3-benzoylaminobenzene, and/or on the other hand the second component of the starting mixture—the 4'-amino-1,1'-azobenzene-4-sulfonic acid—is replaced by the equivalent quantity of an aminoazo compound obtained by coupling a diazotized aminobenzene-monosulfonic acid, such for example as 1-aminobenzene-3-sulfonic acid, 1-aminobenzene-4-sulfonic acid, 1-amino-4-methylbenzene-3-sulfonic acid, 1-amino-2,4-dichlorobenzene-6-sulfonic acid, 1-amino-4-bromobenzene-2-sulfonic acid, 1-amino-4-nitrobenzene-2-sulfonic acid, 1-amino-2-carboxybenzene-4-sulfonic acid, 1-amino-2-carboxybenzene-5-sulfonic acid, or a diazotized aminonaphthalene-monosulfonic acid such for example as 1-aminonaphthalene-4-sulfonic acid, 1-aminonaphthalene-5-sulfonic acid, 2-aminonaphthalene-6-sulfonic acid, 2-amino-naphthalene-7-sulfonic acid or 2-aminonaphthalene-8-sulfonic acid, with one of the precedingly-mentioned amines of the benzene series.

Example 2

232 parts (0.5 mol) of the aminomonoazo compound, prepared by coupling diazotized 2-aminonaphthalene-6,8-disulfonic acid with 1-amino-3-acetylaminobenzene, and 225.5 parts (0.5 mol) of the aminomonoazo compound, prepared by coupling diazotized 2-aminonaphthalene-6,8-disulfonic acid with 1-amino-2-methoxy-5-methylbenzene are together dissolved neutral in water with the addition of aqueous sodium hydroxide solution, after which condensation with 76.5 parts (0.5 mol) of fumaric acid dichloride is carried out after the manner described in Example 1. The isolated resultant dyestuff mixture is a yellow powder and dyes cotton and fibers of regenerated cellulose in pure yellow shades which are very fast to light. The asymmetrical component of the mixture corresponds to the formula

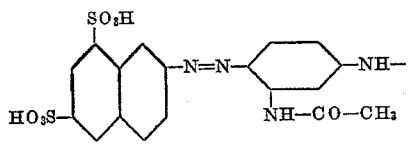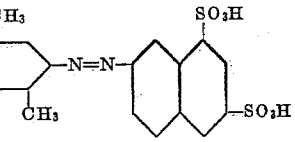

Dystuffs with similar properties are obtained when, in the preparation of either or both of the aforesaid aminomonoazo compounds, the 2-aminonaphthalene-6,8-disulfonic acid is replaced by one of the aminonaphthalene-disulfonic acids mentioned in Example 1 and/or the 1-amino-3-acetylaminobenzene or the 1-amino-2-methoxy-5-methylbenzene, respectively, is replaced by one of the amines of the benzene series mentioned in Example 1, with the proviso that the two starting compounds must be different from each other.

Example 3

270 parts (0.5 mol) of the aminomonoazo compound, prepared by coupling diazotized 2-aminonaphthalene-4,8-disulfonic acid with 1-amino-3-methylbenzene, condensing the thus-obtained intermediate with 4-nitro-benzene-1-carboxylic acid chloride and then reducing the nitro group to the amino group, and 225.5 parts (0.5 mol) of the aminomonoazo compound, prepared by coupling diazotized 2-aminonaphthalene-6,8-disulfonic acid with 1-amino-2-methoxy-5-methylbenzene are together dissolved neutral in water with the addition of aqueous sodium hydroxide solution, and then condensation carried out according to the data of Example 1 with 76.5 parts (0.5 mol) of fumaric acid dichloride. The thus-produced dyestuff mixture is, after isolation, a yellow powder and dyes cotton and fibers of regenerated cellulose in yellow shades which are very fast to light. The asymmetrical component of the mixture corresponds to the formula

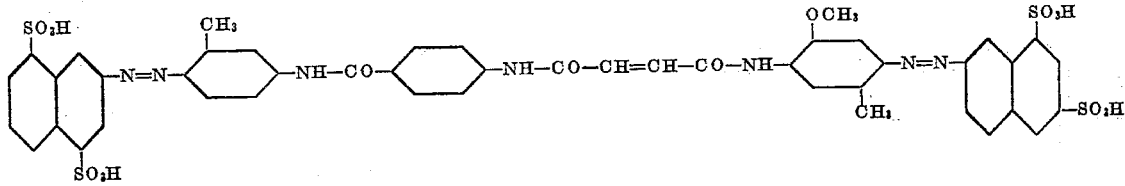

Dystuffs with similar properties are obtained when, in the preceding paragraph, the 2-aminobenzene-1-carboxylic acid radical in the first of the recited aminomonoazo compounds is replaced by the 3-aminobenzene-1-carboxylic acid group (i. e. when, in lieu of the 4-nitrobenzene-1-carboxylic acid chloride, use is made of 3-nitrobenzene-1-carboxylic acid chloride).

*Example 4*

222.3 parts (0.45 mol) of the aminomonoazo compound, prepared by coupling 2-aminonaphthalene-6,8-disulfonic acid with 1-amino-2-methoxy-5-acetylaminobenzene, and 261.3 parts (0.55 mol) of the aminodisazo compound, prepared by coupling diazotized 4'-amino-1,1'-azobenzene-4,3'-disulfonic acid with 1-amino-3-methylbenzene, are together dissolved neutral in water with the addition of aqueous sodium hydroxide solution, after which condensation is carried out with 76.5 parts (0.5 mol) of fumaric acid dichloride in accordance with the data of Example 1. The resultant dyestuff mixture is a brown powder and dyes cotton and fibers of regenerated cellulose in orange shades which are of excellent dischargeability and fastness to light. The asymmetrical component of the mixture corresponds to the formula

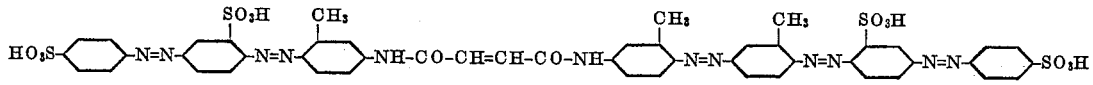

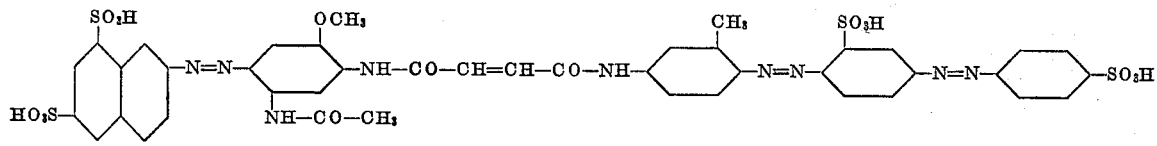

Dyestuffs with similar properties are obtained when, on the one hand, the 2-aminonaphthalene-6,8-disulfonic acid used in preparing the aforesaid aminomonoazo compound is replaced by one of the aminonaphthalene-monosulfonic, or -disulfonic acids mentioned in Example 1 and/or the 1-amino-2-methoxy-5-acetylaminobenzene by one of the amines of the benzene series mentioned in Example 1, and/or on the other hand, the 1-amino-3-methylbenzene used in preparing the aminodisazo compound is replaced by one of the amines of the benzene series mentioned in Example 1.

*Example 5*

158 parts (0.33 mol) of the aminodisazo compound, prepared by coupling diazotized 4'-amino-1,1'-azobenzene-4,3'-disulfonic acid with 1-amino-3-methylbenzene, and 396 parts (0.66 mol) of the aminotrisazo compound, prepared by coupling diazotized 4'-amino-1,1'-azobenzene-4,3'-disulfonic acid with 1-amino-3-methylbenzene, diazotizing the thus-obtained intermediate and coupling with 1-amino-3-methylbenzene, are together dissolved in water with the addition of aqueous sodium hydroxide solution, and then condensation carried out according to the data of Example 1 with 76.5 parts (0.5 mol) of fumaric acid dichloride. The resultant dyestuff mixture is a dark-brown powder which dyes cotton and fibers of regenerated cellulose in yellowish brown shades of good dischargeability and fastness to light. The asymmetrical component of the mixture corresponds to the formula Dyestuffs with similar properties are obtained when, in preparing the aminodisazo compound in the preceding paragraph, the 1-amino-3-methylbenzene is replaced by one or more times by one of the amines of the benzene series mentioned in Example 1.

*Example 6*

242.8 parts (0.4 mol) of the aminodisazo compound, prepared by the alkaline coupling of disazotized 4'-amino-1,1'-azobenzene-4,3'-disulfonic acid with 2-amino-5-hydroxynaphthalene-7-sulfonic acid, and 285 parts (0.6 mol) of the amino-diazo compound, prepared by coupling diazotized 4'-amino-1,1'-azobenzene-4,3'-disulfonic acid with 1-amino-3-methyl-benzene, are together dissolved in water with the addition of aqueous sodium hydroxide solution, after which condensation is carried out according to Example 1 with 76.5 parts (0.5 mol) of fumaric acid dichloride. The thus-prepared dyestuff mixture is, after isolation, a dark-brown powder and dyes cotton and fibers of regenerated cellulose in light-fast scarlet-red shades. The asymmetrical component of the mixture corresponds to the formula

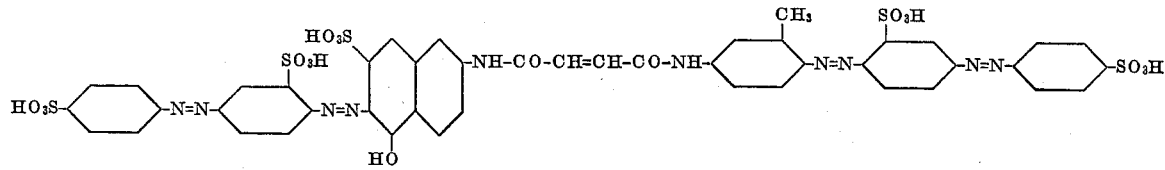

Dyestuffs with similar properties are obtained when, in the preparation of the first of the aminodisazo compounds, according to the preceding paragraph, the 4'-amino-1,1'-azobenzene-4,3'-disulfonic acid is replaced by 4'-amino-1,1'-azobenzene-4-sulfonic acid or by 4'-N-(4''-aminobenzoyl)-amino-1,1'-azobenzene-4,3'-disulfonic acid and/or on the other hand the 1-amino-3-methylbenzene, used in preparing the second aminodisazo compound, is replaced by one of the amines of the benzene series mentioned in Example 1.

The following examples, set up in tabular form, further illustrate the invention. The procedure is in each case analogous to that of Example 1. The resultant dyeings are characterized by good dischargeability and fastness to light.

TABLE

| Example No. (1) | Condensation with Fumaric Acid Dichloride or Dibromide | | Shade of Dyeing on Cotton (4) |
|---|---|---|---|
| | First Component (2) | Second Component (3) | |
| 7 | 4'-amino-1,1'-azobenzene-4,3'-disulfonic acid ⟶ 1-amino-2-methoxy-5-methylbenzene. | 2-aminonaphthalene-4,8-disulfonic acid ⟶ 1-amino-3-methylbenzene ⟶ 1-amino-3-methylbenzene. | orange. |
| 8 | 2-aminonaphthalene-4,8-disulfonic acid ⟶ 1-amino-3-acetylaminobenzene. | aminobenzene ⟶ 1-aminonaphthalene-6-sulfonic acid ⟶ 1-aminonaphthalene-6-sulfonic acid ⟶ 2-amino-8-hydroxynaphthalene-6-sulfonic acid. | greenish olive. |
| 9 | ....do.... | 1-aminobenzene-3-sulfonic acid ⟶ 1-aminonaphthalene-6-sulfonic acid ⟶ 1-aminonaphthalene ⟶ 2-amino-5-hydroxynaphthalene-7-sulfonic acid. | Do. |
| 10 | 1-aminobenzene-4-sulfonic acid ⟶ 1-amino-2-methoxy-5-methylbenzene. | 2-aminonaphthalene-6,8-disulfonic acid ⟶ 1-amino-3-methylbenzene ⟶ 1-amino-2-methoxy-5-methylbenzene. | yellowish orange. |
| 11 | 2-aminonaphthalene-6,8-disulfonic acid ⟶ 1-amino-2-methoxy-5-methylbenzene. | ....do.... | orange. |
| 12 | 2-aminonaphthalene-4,8-disulfonic acid ⟶ 1-amino-2-ethoxy-5-benzoylaminobenzene. | 2-aminonaphthalene-4,8-disulfonic acid ⟶ 1-amino-3-acetylaminobenzene ⟶ 1-amino-3-methylbenzene. | Do. |
| 13 | 2-aminonaphthalene-6,8-disulfonic acid ⟶ 1-amino-3-methylbenzene ⟶ 1-amino-2-methoxy-5-methylbenzene. | 2-aminonaphthalene-6,8-disulfonic acid ⟶ aminobenzene ⟶ 1-amino-3-methylbenzene. | Do. |
| 14 | 2-aminonaphthalene-6,8-disulfonic acid ⟶ 1-amino-2-methylbenzene ⟶ 1-amino-3-methylbenzene. | 4'-amino-1,1'-azobenzene-4,3'-disulfonic acid ⟶ 1-amino-3-methylbenzene. | yellowish orange. |
| 15 | 2-aminonaphthalene-4,8-disulfonic acid ⟶ 1-amino-3-methylbenzene ⟶ 1-amino-2-methoxy-5-methylbenzene. | 4'-amino-1,1'-azobenzene-4,3'-disulfonic acid ⟶ 1-amino-2,5-dimethylbenzene. | orange. |
| 16 | ....do.... | 4'-amino-1,1'-azobenzene-4,3'-disulfonic acid ⟶ 1-amino-2-methoxy-5-methylbenzene. | Do. |
| 17 | 2-aminonaphthalene-6,8-disulfonic acid ⟶ 1-amino-3-methylbenzene ⟶ 1-amino-3-methylbenzene ⟶ 1-amino-2-methoxy-5-methylbenzene. | 2-aminonaphthalene-6,8-disulfonic acid ⟶ 1-amino-3-acetylaminobenzene ⟶ 1-amino-3-methylbenzene. | reddish brown. |
| 18 | 4'-amino-1,1'-azobenzene-4,3'-disulfonic acid ⟶ 1-amino-3-methylbenzene ⟶ 1-amino-3-methylbenzene. | 4'-amino-1,1'-azobenzene-4,3'-disulfonic acid ⟶ 1-amino-3-methylbenzene ⟶ 1-amino-2-methoxy-5-methylbenzene. | yellowish brown. |
| 19 | 1-aminobenzene-4-sulfonic acid ⟶ 1-aminonaphthalene-6-sulfonic acid ⟶ 1-amino-3-methylbenzene. | 4'-amino-1,1'-azobenzene-4,3'-disulfonic acid ⟶ 1-amino-3-methylbenzene. | Do. |
| 20 | 4'-amino-1,1'-azobenzene-4,3'-disulfonic acid ⟶ 1-amino-3-methylbenzene, condensed with 4-nitrobenzene-1-carboxylic acid chloride and reduced to the amino compound. | ....do.... | yellow. |
| 21 | 2-aminonaphthalene-6,8-disulfonic acid ⟶ 1-amino-2-methoxy-5-butyrylaminobenzene. | ....do.... | Do. |
| 22 | 2-aminonaphthalene-4,8-disulfonic acid ⟶ 1-amino-3-(4'-methyl)-benzoylaminobenzene. | 1-aminobenzene-4-sulfonic acid ⟶ 1-aminonaphthalene ⟶ 1-aminonaphthalene-6-sulfonic acid ⟶ 2-amino-8-hydroxynaphthalene-6-sulfonic acid. | greenish olive. |

If, in the foregoing examples, the condensation is effected with symmetrical maleic acid dichloride or with the dichloride of chloro-fumaric acid or of bromo-fumaric acid or of methyl-fumaric acid, instead of with fumaric acid dichloride or dibromide, similar products are obtained which also yield dyeings of very good dischargeabiltiy and fastness to light.

In Examples 7 to 22, the ratio of the first mixture component to the second component may be 1:1. However, other ratios, such as 4:1, 3:1, 2:1, 1:2, 1:3 and 1:4 may be employed, with the proviso that in every case two mols of the mixture of first and second components are condensed with one mol of dicarboxylic acid halide.

The formulae of the asymmetrical component of the products obtained in selected illustrative ones of the preceding tabular examples follows:

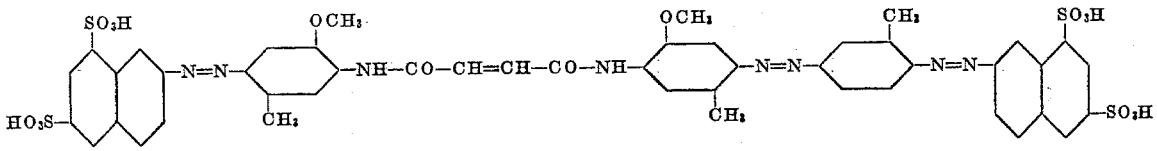

*Example 11*

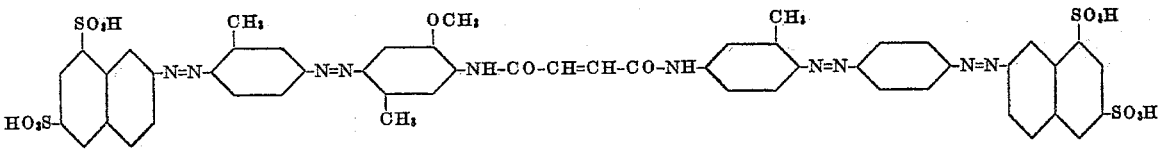

*Example 13*

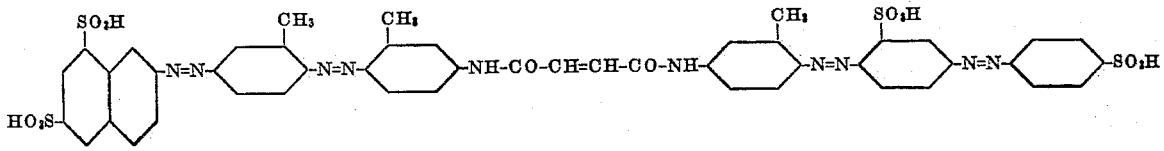

Example 14

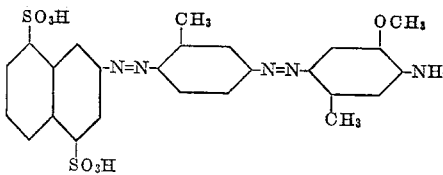 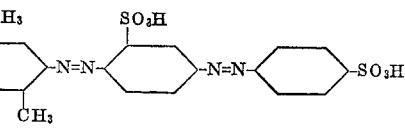

Example 16

In all the examples, the binding of the liberated hydrogen halide may, with equal success, be effected with sodium bicarbonate, potassium bicarbonate, sodium hydroxide, potassium hydroxide, potassium carbonate, lithium carbonate, calcium hydroxide, calcium carbonate, magnesium oxide, or N,N-dimethylaminobenzene, instead of with sodium carbonate.

Example 23

100 parts of cotton are introduced at 80° into a dyebath containing a solution of 1 part of anhydrous sodium carbonate and 0.5 part of dyestuff obtainable according to Example 2 (first paragraph) in 2000 parts of water.

The dyebath is slowly heated to boiling, 20 parts of anhydrous sodium sulfate are added and the bath then allowed to cool slowly to 70°. The dyed material is withdrawn, rinsed with cold water and dried. There is thus obtained a yellow dyeing of excellent fastness to light and dischargeability.

The dyestuffs of the other examples may be used for dyeing in essentially analogous manner.

Having thus disclosed the invention what is claimed is:

1. A water-soluble, non-metallizable azo dyestuff which corresponds to the formula

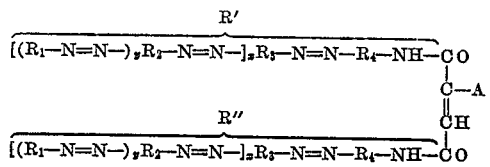

wherein each $x$ and each $y$ is one of the numerals 0 and 1, each $R_1$, $R_2$, $R_3$ and $R_4$ stands for a radical selected from the group consisting of substituted and unsubstituted radicals of the benzene and naphthalene series, such radicals possessing together at least one and at most three solubilizing groups, the substituents on the said radicals being selected from the class consisting of chlorine and bromine atoms and hydroxy, lower alkyl, lower alkoxy, acylamino, nitro, carboxylic acid and sulfonic acid groups, and A stands for a member selected from the group consisting of hydrogen, chlorine, bromine and methyl, and wherein the moieties $R'$ and $R''$ are not identical.

2. The disazo dyestuff which corresponds to the formula

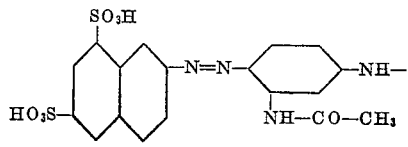 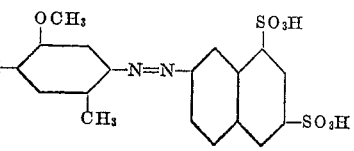

3. The trisazo dyestuff which corresponds to the formula

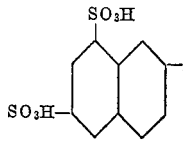 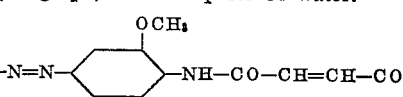 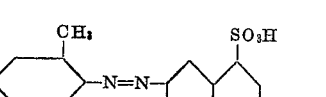

4. The tetrakisazo dyestuff which corresponds to the formula

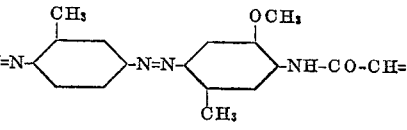

5. The tetrakisazo dyestuff which corresponds to the formula

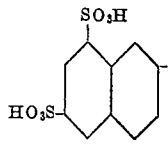 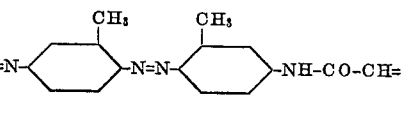

6. The tetrakisazo dyestuff which corresponds to the formula

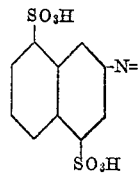 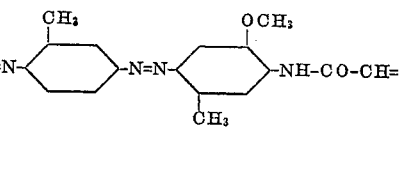

References Cited in the file of this patent

UNITED STATES PATENTS

| | | |
|---|---|---|
| 2,104,595 | Schirm | Jan. 4, 1938 |
| 2,646,338 | Kappeler | July 21, 1953 |
| 2,673,198 | Grandjean et al. | Mar. 23, 1954 |

FOREIGN PATENTS

| | | |
|---|---|---|
| 418,455 | Great Britain | Oct. 25, 1934 |
| 504,489 | Belgium | July 31, 1951 |